Oct. 8, 1968 R. H. BADGLEY ETAL 3,405,362

SPACE DISCHARGE TUBE CIRCUIT

Filed Dec. 20, 1943

INVENTORS R. H. BADGLEY
L. G. SCHIMPF
BY H. A. Burgess
ATTORNEY

United States Patent Office 3,405,362

Patented Oct. 8, 1968

3,405,362

SPACE DISCHARGE TUBE CIRCUIT

Robert H. Badgley, New Providence, N.J., and Luther G. Schimpf, New Brighton, N.Y., assignors to Bell Telephone Laboratories, Incorporated, New York, N.Y., a corporation of New York Filed Dec. 20, 1943, Ser. No. 514,995

8 Claims. (Cl. 328—151)

Figures 1, 2:
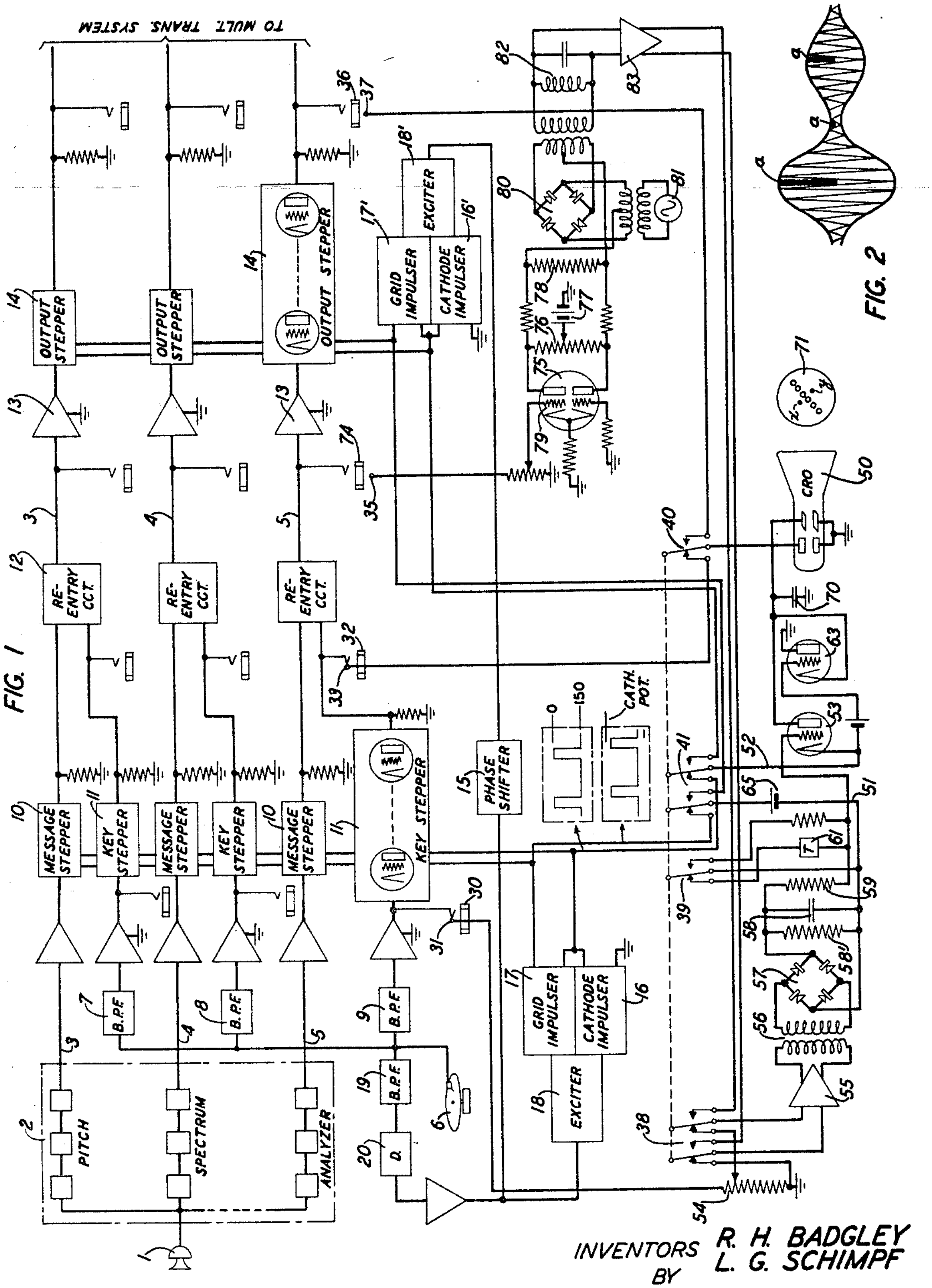

The present invention relates to electrical measuring, testing or indicating and specifically involves a space discharge tube circuit for enabling rapid sampling of current or voltage in a circuit to be made and indicated even where the current or voltage may be varying rapidly as in the case of transients.

The invention is capable of general application but for the purpose of illustrating one specific application it will be disclosed herein as embodied in a testing circuit for a secret telephone terminal in which gas-filled tubes are used to produce impulses which are supposed to have definite quantitative relationships and the embodiment is in the form of a checking circuit to determine whether these tubes are performing properly at any instant.

The main object of the invention is to provide for rapid and accurate indications of electrical quantities in which the indication is held constant for a long enough time to be suitably registered.

A related object is to enable a condenser to be charged to a definite value for a given time, discharged, and recharged to a different value either higher or lower, by electronic circuit means.

In accordance with one feature, the invention provides a first grid-controlled space discharge tube for placing a charge on a condenser and a second grid-controlled space discharge tube for discharging the condenser quickly after a given time interval and permitting the first tube to recharge the condenser to a new value.

The nature of the invention and its various objects and features will be more fully understood from the following detailed description taken in connection with the accompanying drawings in which:

FIG. 1 is a simplified schematic circuit diagram of a portion of a transmitting terminal of a secret telephone system in which a testing circuit according to this invention is embodied; and FIG. 2 is a diagram showing the instant at which a pulse is sampled.

The secret telephone terminal briefly indicated in the drawing forms no part of the present invention but is of the type disclosed in an application of Lundstrom and Schimpf Ser. No. 456,322, filed Aug. 27, 1942, to which reference may be had for more detailed information. In this type of system speech waves from the microphone 1 or other input are analyzed in analyzer 2 to provide a number of different speech-defining low frequency currents in a number of channels, such as eleven for example, and a separate key is used to encipher the current in each channel to render the transmission secret. Three such channels are shown in the drawing at 3, 4 and 5 with others indicated. The secret key waves are derived from a phonograph record 6 on which all the keys for all of the channels are recorded at different frequencies similarly to multiplex carrier wave transmission and these key currents are separated by band filters 7, 8, 9 for individual application to the channels.

Message steppers 10 and key steppers 11 are used to convert both the signal-defining low frequency currents and the key currents into stepped form, there being six steps including zero as one step, and the voltage interval between steps in the case of the message having the same values as those in the case of the key. After the currents leave the steppers they are combined or added in the reentry circuits 12 and these circuits also perform a subtracting operation where necessary to bring the summation current within the maximum step range that the message or key alone can have. Following the reentry circuits are amplifiers 13 and output steppers 14 which are similar in general to the message and key steppers and which reform the currents into accurately stepped form for transmision over whatever multiplex circuit is used to the distant terminal.

Each of the steppers that have been mentioned comprises five grid-controlled gas-filled tubes with their input connections in parallel across the channel but with their individual input potentiometers set to five different positions so as to give the tubes different sensitivities, that is, different firing voltages. If the input is less than that corresponding to step 1, no tubes fire and an output current of zero results. If the input has a value between step 1 and step 2, one tube fires giving an output of step 1 value, and so on, making a total of six steps including zero.

In order to restore the gas tubes that have fired, the plate voltage of all tubes is removed for a period of 2 milliseconds, the total step length of the output voltage being 18 milliseconds in the case of the message and key steppers and 14 milliseconds with 6-millisecond spaces in the case of the output steppers, making a time interval of 20 milliseconds between firing times. In order to sample the input at one particular instant of time the grids of all stepper tubes have a pulse applied to them which swings the grid voltage in the positive direction sufficiently to enable one or more of them to fire when supplemented by the input voltage, if this has a step 1 or greater than step 1 voltage. This exposure time occurs at the beginning of each 18-millisecond or 14-millisecond pulse period, as the case may be.

These conditioning voltages that are applied to the anodes and grids of the stepper tubes to enable them to perform their stepping function are derived from pulsing power supplies merely indicated in FIG. 1 by boxes, 16 for the message and key stepper cathode impulser which swings the cathode from ground (zero) voltage to −150 volts for the 18-millisecond period and back to ground for the 2-millisecond period, and 17 for the message and key stepper grid impulses which keep the grids at −100 volts with respect to the cathode for all except the 2-millisecond interval immediately following the restoring interval of these tubes. Similar pulsing power supplies for the output steppers are shown at 16′ and 17′. About a half millisecond after the cathode voltage has swung to −150 volts, the grid voltage is swung from −100 volts to about −4 volts relative to the cathode, for the 2-millisecond exposure interval. These voltage and time relations are indicated in the small diagrams adjacent the boxes 16 and 17 with arrows from the leads in which the voltages exist.

These voltage impulses are derived from the exciter 18 or 18′ in the same way that is disclosed in the Lundstrom and Schimpf application under control of a 50-cycle wave derived in this instance from the record by picking off through filter 19 two waves having a frequency difference of 50 cycles and detecting them at 20 to recover the 50-cycle difference wave. The exciter comprises pairs of tubes for respectively determining the beginnings and ends of the pulses and phase shifters for determining the phase of the 50-cycle wave at which the pulses occur. By adjusting the phase shifters the phase relation of the pulses can be controlled to secure the time relations just described. The exciter 18′ for the pulsing supplies 16′ and 17′ is controlled by the same 50-cycle wave after passing through phase shifter 15 to provide a slight delay in the firing of the output steppers relative to the message and key steppers. The exciter 18' is adjusted or proportioned to give the 14-millisecond pulses alternating with 6-millisecond spaces referred to for the case of the output steppers.

The remainder of the circuit of FIG. 1 that has not already been specifically described comprises the checking circuit in accordance with the present invention. This equipment can be connected to any key or output stepper for checking it by insertion of a pair of plugs into the test jacks for the particular stepper. The circuit is shown plugged up for testing the key stepper 11 which has an input test jack 30 and an output test jack 32. Plugs 31 and 33 are shown in these jacks. Output stepper 14 can be tested by inserting plug 35 in jack 74 and plug 37 in jack 36 and throwing the switches or keys 38, 39, 40 and 41 to the right, these being shown as thrown to the left where they must be for testing stepper 11. With the testing circuits connected up as shown, some of the output voltage from stepper 11 is applied through key 40 to the horizontal plates of cathode ray oscillograph 50 and some of the input voltage into stepper 11 is applied through key 38 to the stepping circuit in the test set and the resulting steps are applied to the vertical plates of the oscillograph tube 50 for comparison with the steps in the output of the stepper under test.

The character of the wave in the input to the stepper 11 is indicated in FIG. 2 as a continuous wave of a few hundreds or thousands of cycles per second modulated at a 50-cycle rate to different amplitudes representing the key steps. The timing of the pulsing supplies is such that this wave is sampled at its peak points *a, a, a* for a 2-millisecond period by the key stepper. Leads 51 and 52 extend from the pulsing supplies 16 and 17 to the tube 53 in the test set so that this tube also samples the input wave at the same times *a, a, a* in the manner presently to be described.

The voltage at the jack 30 is placed across high resistance 54 which is so high as not to drain off an appreciable amount of the key current. This voltage is amplified at 55 (switch 38 being closed to the left) and is applied through transformer 56 to the full wave rectifier 57 where it is converted to a direct current pulse which is filtered by shunt capacity 58 and resistance 58' and impressed across a potentiometer consisting of an ohmic resistance 59 and a Thyrite resistor 61 which has a non-linear voltage current characteristic. This is for the reason that the steps in the input wave to the stepper 11 occur in equal steps on a logarithmic scale and the steps appearing in the output of stepper 11 occur in equal steps on a linear scale. Since it is desired to compare the outputs of the stepper under test with that of the stepper in the testing circuit on a linear basis, the Thyrite resistor 61 is used to convert the voltage steps impressed on the grid of tube 53 into steps of equal value on a linear scale. For this purpose the grid of tube 53 is connected across only the Thyrite portion of the potentiometer 59, 61. Tubes 53 and 63 in the testing set are of the highly evacuated type as distinguished from the gas-filled type used in the stepper. It will be noted that the cathode of tube 53 is varied from ground potential to −150 volts by lead 52 and that the grid has its potential varied over lead 51 from about −100 volts relative to its cathode to −8, the extra four volts over the −4 volts mentioned above as existing in lead 51 being obtained from the 4-volt bias battery 65.

These voltages are phased so that at the beginning of any 20-millisecond interval the cathode supply pulses from −150 volts to zero and remains at this value for 2 milliseconds. During this interval the grid supply is about −100 volts, referred to the cathode, thus holding the tube below cut-off. About 0.5 millisecond after the cathode supply returns to −150 volts the grid supply changes from about −100 volts to −8 volts, bringing the tube to the lower edge of the conducting range. Any voltage that is applied to the grid circuit from the rectifier at this time moves the grid voltage farther into the conducting range and establishes a charge on the condenser 70 in the plate circuit that is proportional to the voltage applied. After 2 milliseconds the grid supply changes back to −100 volts, cutting off the tube. Any charge that is on the condenser at this time remains there for the duration of the 20-millisecond interval.

In order to discharge the condenser rapidly at the end of the 20-millisecond period, it is necessary to provide a low impedance path to ground. This is obtained by connecting tube 63 from the plate of the continuous stepper tube 53 to ground. During the time that the cathode supply is at −150 volts, the discharge tube 63 has a high negative bias on its grid and is of high impedance. However, when the cathode supply pulses to zero voltage, the battery in grid circuit of this tube 63 applies a positive bias to the grid and the tube 63 becomes of low impedance and discharges the condenser. When the cathode supply goes back to −150 volts, the tube becomes of high impedance and the condenser is ready to receive a new charge. Condenser 70 charges to some voltage considerably less than 150 volts, for example, a voltage less than 100 volts.

The voltage existing across the condenser 70 is applied to the vertical plates of the oscillograph 50. If the stepper under test is operating properly, a row of dots will appear on the screen as indicated at 71, one dot for each of the six step values including zero. If a tube in the stepper under test, such as the tube corresponding to step 3 for example, fails to fire, the spot for step 3 will be displaced out of line toward the left to some position *x*, while if this tube fires falsely when only two steps should be fired, the spot will be displaced downward to some point *y*. The grid circuit of this stepper tube is then adjusted until the spot is brought back into line. When all of the spots appear on a 45-degree line the stepper is known to be in proper adjustment.

In testing the output steppers, a modified type of circuit must be used since the input voltage is a direct current voltage in contrast to the input to the key steppers which is an alternating current voltage. The output stepper 14 may be tested by inserting into jacks 74 and 36 plugs 35 and 37, and throwing all keys in the testing circuit to the right. The high impedance input circuit of tube 75 is now bridged across the input side of the stepper 14 and the stepper output is applied to the horizontal plates of the oscillograph 50 through key 40. Tube 75 is a balanced tube having two parts connected to draw currents in opposite directions through opposite halves of resistor 76 from battery 77. This permits placing across resistor 78 a zero voltage for zero input to the control grid 79 and direct current potential proportional to the input on grid 79 while keeping variations in battery voltage at 77 or in cathode emission in tube 75 from appearing across resistor 78.

The direct current voltage steps are, therefore, amplified at 75 and placed across opposite terminals of the double balanced modulator circuit 80 supplied with constant amplitude waves of convenient frequency, such as 2 kilocycles from source 81. The resulting output modulated wave has a shape somewhat similar to that of FIG. 2 except that in this case the steps vary linearly rather than on a decibel basis. This wave is selected by tuned circuit 82, amplified at 83 and impressed across the input side of amplifier 55, key 38 being in its right-hand position. Key 41 now connects pulsing supplies 16', 17' to the cathode and grid of tube 53 to time its operation to that of the output stepper. The action of the circuit from this point on is the same as previously described except that the Thyrite resistor 61 is switched out of circuit and is replaced by ohmic resistance 85 by key 39 in its right-hand position since no conversion to linear ratio is now needed.

The invention is not to be construed as limited to the exact circuit arrangement shown nor to the specific use or application disclosed nor to the values or quantities given since these are for illustration, the scope of the invention being defined in the claims.

What is claimed is:

1. In a timing circuit a condenser and an indicator connected across said condenser, a first grid-controlled discharge tube having said condenser included serially in its anode-cathode circuit, a second grid-controlled discharge tube having its grid connected to the cathode of said first tube and having its cathode and anode connected in shunt to said condenser with its anode connected to the same terminal of the condenser that is connected to the cathode of the first tube, a source of anode voltage connected between said terminal and the cathode of said first tube, a circuit for impulsing the grid of said first tube to charge said condenser, and means to reduce the anode voltage applied to said first tube sufficiently to permit the second tube to discharge said condenser.

2. In a space discharge tube circuit, a first grid-controlled tube, a condenser connected in the output circuit of said tube and adapted to be charged by the output current of said tube, a source of anode voltage connected between the cathode of said tube and a terminal of said condenser, and a second space discharge tube having its anode and cathode connected across said condenser in a sense opposite to the connection of said first tube for discharging said condenser when the grid of the second tube has its voltage in the conducting region, a conductive connection from the grid of said second tube to the cathode of said first tube, means for applying voltage pulses to the grid of the first tube to charge said condenser, and means for reducing said anode voltage sufficiently to allow said second tube to discharge said condenser.

3. In a condenser circuit, a condenser to be charged and discharged, a source of direct current voltage and variable resistance connected in series across said condenser, with the minus pole of said source connected to one end of said resistance, a grid-controlled space discharge device having its grid connected to the junction between said minus pole and said resistance, its anode connected in common to the opposite pole of said source and a terminal of said condenser, and its cathode connected in common to the opposite terminal of said condenser and the opposite end of said resistance, means for varying said resistance between one value permitting charging current to flow into said condenser and another value substantially isolating said source from said condenser, and means to remove voltage from said source sufficient to permit said device to discharge said condenser.

4. A stepping circuit for converting varying input voltage into steps of output voltage comprising a first grid-controlled tube, a pulsing supply for its grid-cathode circuit and a pulsing supply for its cathode-anode circuit, a condenser in the output of said tube adapted to receive a charge from said second pulsing supply whenever said tube has low impedance, means to drive said tube to low impedance under control of said first pulsing supply thereby placing a charge on said condenser, and a second grid-controlled tube having its cathode-anode circuit connected across said condenser in reverse relation to said first tube and having its grid circuit controlled from said second pulsing supply for discharging said condenser.

5. A circuit for testing a stepper whose input voltage varies in amplitude with time and whose output voltage normally varies in equal steps, including a pulsing supply for said stepper for determining the beginnings and ends of said steps, said testing circuit comprising a vacuum tube having a condenser in its output circuit, means including said pulsing supply for causing said tube to place a charge on said condenser at the beginning of each step, proportional to the stepper input voltage at the same instant, a second vacuum tube having its space path bridged across the terminals of said condenser, means including said pulsing supply for causing said second tube to discharge said condenser at the end of each step, and means to compare the output of said stepper with the voltage existing across said condenser.

6. A circuit for sampling a variable amplitude wave at definite times and for producing flat topped pulses having amplitudes proportional to the sampled amplitudes comprising a grid-controlled tube having means for biasing the grid beyond cut-off at all times except the sampling times, said means during the sampling times biasing the grid into the conducting region of the tube, a source of space current for said tube, a condenser in the output circuit of said tube for receiving from the tube a charge proportional to the sampled amplitude, a second grid-controlled tube for discharging said condenser at the end of each pulse, said second tube having a cathode-anode circuit bridged across said condenser and its grid connected to receive a negative voltage from said source, and means operative at the end of each pulse to radically reduce the voltage applied across the space current path of said first tube and to the grid of said second tube from said source to cause said second tube to discharge said condenser.

7. In combination, a condenser to be charged and discharged at definite time intervals, a pair of grid-controlled vacuum tubes having their anode-cathode circuits connected across said condenser in mutually reversed relation, a source of space current for the first tube, said source serving to bias the grid of the second tube beyond cut-off, means to swing the grid voltage of the first tube from beyond cut-off into the conducting range to cause the first tube to transmit charging current from said source into said condenser, means to swing the grid of the first tube beyond cut-off to effectively isolate the condenser from said source, and means for subsequently discharging the condenser through said second tube comprising means to reduce the voltage applied to the grid of said second tube from said source to render said second tube conducting.

8. In combination, a condenser to be charged and discharged in definite time intervals, comprising a pair of grid-controlled space discharge devices having their cathode-anode circuits connected across said condenser in cathode-anode circuits connect across said condenser in mutually reversed direction, a source of periodically interrupted anode supply voltage connected to apply negative voltage to the cathode of the first or charging tube, and to the grid of the second or discharging tube, and a source of periodically interrupted grid bias voltage connected in the cathode-grid circuit of said first tube, said sources having their interruption times staggered.

References Cited

UNITED STATES PATENTS

| | | | |
|---|---|---|---|
| 1,955,332 | 4/1934 | Iams. | |
| 2,110,015 | 3/1938 | Fitzgerald | 250— |
| 2,179,105 | 11/1939 | Sidney | 250— |
| 2,188,970 | 2/1940 | Wilson | 250— |
| 2,275,460 | 3/1942 | Page. | |
| 2,284,101 | 5/1942 | Robins | 250— |

ARTHUR GAUSS, *Primary Examiner.*